F. S. DENNEEN & C. N. MITCHELL.
SUSPENSION DEVICE FOR BATTERIES.
APPLICATION FILED FEB. 27, 1917.
1,283,107. Patented Oct. 29, 1918.
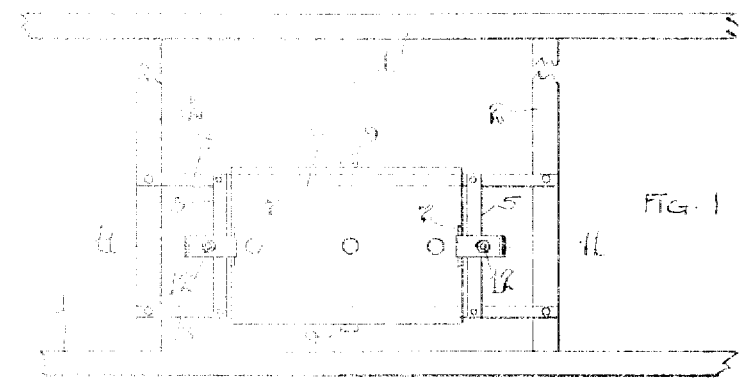
FIG. 1
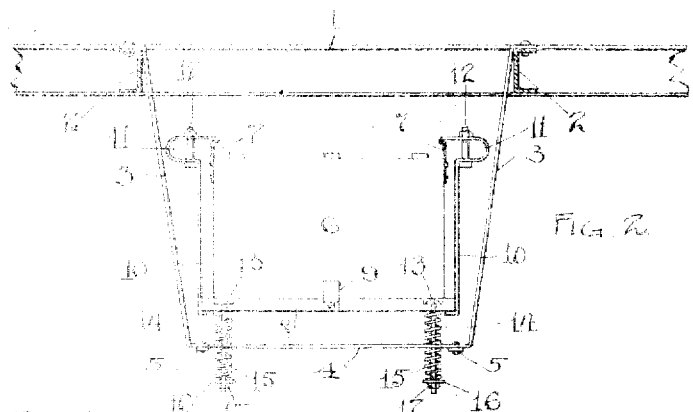
FIG. 2
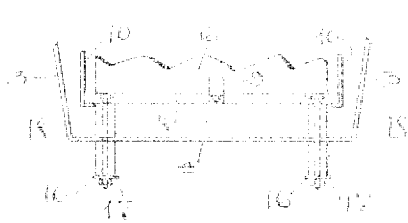
FIG. 3
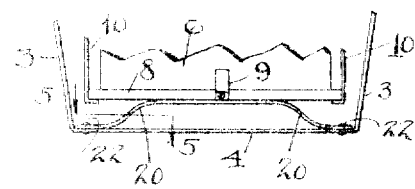
FIG. 4
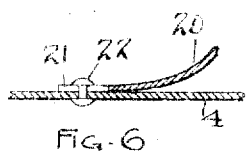
FIG. 6
INVENTOR
Francis S. Denneen and
Courtney N. Mitchell
BY Fay, Oberlin & Fay
ATTORNEYS

UNITED STATES PATENT OFFICE.

FRANCIS S. DENNEEN AND COURTNEY N. MITCHELL, OF CLEVELAND, OHIO, ASSIGNORS, BY DIRECT AND MESNE ASSIGNMENTS, TO HORACE B. FAY, OF CLEVELAND, OHIO.

SUSPENSION DEVICE FOR BATTERIES.

1,283,107.  Specification of Letters Patent.  Patented Oct. 29, 1918.

Application filed February 27, 1917. Serial No. 151,258.

*To all whom it may concern:*

Be it known that we, FRANCIS S. DENNEEN and COURTNEY N. MITCHELL, citizens of the United States, and residents of Cleveland, county of Cuyahoga, State of Ohio, have jointly invented a new and useful Improvement in Suspension Devices for Batteries, of which the following is a specification, the principle of the invention being herein explained and the best mode in which we have contemplated applying that principle, so as to distinguish it from other inventions.

The present improvements, relating as indicated to a suspension device for batteries, has more particular regard to the provision of means for carrying an electrical battery or similar article on a motor-driven vehicle, such as trucks which are subjected to very hard usage, which are usually provided with solid tires and stiff springs, which cause rapid deterioration of electrical batteries by reason of the shocks and vibration transmitted to the batteries. In the past batteries have been very little used on motor-driven trucks for the above reasons and it is the object of the present invention to provide a means for so carrying an electrical battery, or a similarly delicate and sensitive mechanism, that all vibration and shocks will be partially absorbed before transmission to the battery, thus very greatly lengthening the life and efficiency of the battery. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a plan view of a portion of a vehicle frame upon which is mounted our improved invention; Fig. 2 is a side elevation of the device shown in Fig. 1, which is a preferred form of our invention; Fig. 3 is a view similar to Fig. 2, but illustrating a modification of construction; Fig. 4 is a similar view showing still another modification; Fig. 5 is a section on the line 5—5 in Fig. 4; and Fig. 6 is a section on the line 6—6 in Fig. 5.

Referring now to Figs. 1, 2, 3, 4 and 5 there is shown a vehicle frame consisting of the usual parallel longitudinal members 1. From these transverse members 2 there are supported a plurality of depending strap members 3 connected at spaced points by transverse members 5. The members 3 and 5 are rigidly connected together and constitute a sub-frame within the main frame of the vehicle upon which the battery may be supported in a yielding manner by means which will presently be described. It is desirable in the usual vehicle to so position the members 3 and 5 that the battery may be carried below the level of the main frame members 1, although this is not essential except that by so locating the battery its weight is kept as low as possible, and the space above the frames left free for the body and load.

Referring to Figs. 1 and 2 there is shown a battery of the usual type, provided with handles 7 at either end, this battery being mounted upon a plate 8 which is provided at either side with clips 9 for maintaining the battery in alinement with the plate. At either end of the plate 8 are mounted upwardly extending members 10 provided at their upper ends with relatively flexible loop portions 11 which fit over the handles 7 as indicated and serve to hold the battery in place on the plate 8. Bolts 12 are passed through the two sides of the loop 11 and these may be adjusted to bring the ends of the loops into position to engage the handles of different sized batteries.

The plate 8 is yieldingly mounted upon the sub-frame consisting of the members 3 and 5 by means of bolts 13 vertically disposed and passed through apertures formed in the members 3 and there being coiled springs 14 and 15 mounted about the bolts 13. The springs 14 are disposed between the members 3 and the plate 8 and are, in the normal operation of the vehicle, under compression. The springs 15 are disposed between the members 3 and washers 16 mounted on the bolts 13 and held in position by nuts 17, and these springs 15 are normally also under slight compression, although only subjected to heavy compression when the frame of the vehicle is dropped slightly due to the wheels having fallen into a rut or hole. By means of the nuts 17, the tension of the springs 14 and 15 may be changed as necessary, to suit varying conditions.

Another form of the invention is shown in Fig. 3, in which construction, however, there is the same sub-frame and the same supporting plate 8. In this form of the invention there are also bolts 13 extending from the plate 8 through apertures in the members 3, but instead of springs interposed between the plate 8 and the members 3 and between the members 3 and the nuts on the end of the bolt 13, we here employ cylindrical members 18 of resilient material, such as rubber, at these points, these members serving to permit a yielding of the battery upon the vertical movement of the frame and sub-frame.

In Figs. 4, 5 and 6 still another modification is shown. In this construction the plate 8 is attached to flattened portions of arched springs 20, which rest at their ends upon the members 3 and are there held in position by being provided with slots 21 receiving studs or rivets 22 set in the members 3. A limited vertical movement is thus given to the plate 8 and the battery thereon.

The operation of the device will be readily seen from the foregoing description. When the vehicle passes over a projection, the sub-frame, consisting of the members 3 and 5, is moved suddenly upward. This movement is not directly transmitted to the battery, but first compresses the springs 14 and the movement is thus yieldingly transmitted to the battery and only part of the movement is thus transmitted. Similarly if the frame is caused to fall this falling movement is transmitted to the battery through the springs 15, which must first be compressed before any movement is given the battery. The present suspension has been found to materially increase the life of batteries when used on motor-driven trucks and to maintain these batteries in very much better condition than is possible when they are supported rigidly on the frame of the vehicle.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. A battery suspension device comprising a frame and means mounted on said frame and adapted to yieldingly support a battery thereon to cushion any upward or downward movement of the same from the normal position thereof.

2. A battery suspension device comprising a frame and means mounted on said frame and adapted to yieldingly support a battery thereon to cushion movement of the same in either vertical direction from the normal position thereof.

3. A battery suspension device comprising a frame, battery supporting means mounted in said frame, and means mounted between said frame and said supporting means and adapted to cushion any upward or downward movement of said battery.

4. A battery suspension device comprising a frame, battery supporting means mounted in said frame, and means mounted between said frame and said supporting means and adapted to cushion movement of said battery in either vertical direction from the normal position thereof.

5. A battery suspension device comprising a frame, battery supporting means mounted in said frame, and resilient means mounted between said frame and said supporting means and adapted to cushion movement of said battery in either vertical direction from the normal position thereof.

6. A battery suspension device comprising a relatively rigid frame adapted to be supported within the frame of a vehicle, a battery receiving carriage, opposed resilient members interposed between said carriage and said frame, and said resilient members being adapted to cushion movement of said carriage in either vertical direction caused by movement of said frame.

7. A battery suspension device comprising a relatively rigid sub-frame adapted to be supported within the frame of a vehicle, a battery receiving carriage mounted on said sub-frame and having vertical movement with respect thereto, and resilient means adapted to cushion and restrain such movement of said carriage in either vertical direction.

8. A battery suspension device comprising a relatively rigid sub-frame adapted to be supported within the frame of a vehicle, a battery receiving carriage mounted on said sub-frame and having vertical movement with respect thereto, and a plurality of resilient members interposed between said carriage and said sub-frame, said members being adapted to support the former on the latter and also to cushion and restrain such movement of said carriage in either direction.

9. A battery suspension device comprising a relatively rigid sub-frame adapted to be supported within the frame of a vehicle, a battery receiving carriage mounted on said sub-frame and having vertical movement with respect thereto, and a plurality of coiled springs interposed between said carriage and said sub-frame, said members being adapted to support the former upon the latter and also to cushion and restrain such movement of said carriage in either direction.

10. A battery suspension device comprising a relatively rigid sub-frame adapted to be supported within the frame of a vehicle, a battery receiving carriage mounted on said sub-frame and having vertical movement with respect thereto, a plurality of guides attached to said carriage and extending through said sub-frame, and resilient members disposed about each of said guides between said carriage and said sub-frame and between said sub-frame and the extending ends of said guides, said members being adapted to support said carriage upon said sub-frame and also to cushion and restrain movement of said carriage in either vertical direction.

11. A battery suspension device comprising a relatively rigid sub-frame adapted to be supported within the frame of a vehicle, a battery receiving carriage mounted on said sub-frame and having vertical movement with respect thereto, a plurality of guides attached to said carriage and extending through said sub-frame, and coiled springs disposed about each of said guides between said carriage and said sub-frame and between said sub-frame and the extending ends of said guides, said springs being adapted to support said carriage upon said sub-frame and also to cushion and restrain movement of said carriage in either vertical direction.

12. A battery suspension device comprising a relatively rigid sub-frame adapted to be supported within the frame of a vehicle, a battery receiving carriage mounted on said sub-frame and having vertical movement with respect thereto, a plurality of guides attached to said carriage and extending through said sub-frame, and longitudinally yielding cylinders disposed about each of said guides between said carriage and said sub-frame and between said sub-frame and the extending ends of said guides, said cylinders being adapted to support said carriage upon said sub-frame and also to cushion and restrain movement of said carriage in either vertical direction.

13. A battery receiving carriage comprising a base plate adapted to receive a battery and upwardly extending arms or said base plate, said arms being provided with compressible loop portions adapted to engage over the ends of such battery.

14. A battery receiving carriage comprising a base plate adapted to receive a battery and upwardly extending arms on said base plate, said arms being provided with compressible loop portions adapted to engage over the ends of such battery, and means adapted to adjustably position the free ends of such loop in engagement with the ends of such battery.

15. A battery receiving carriage comprising a base plate adapted to receive a battery and upwardly extending arms on said base plate, said arms being provided with compressible loop portions having curved ends adapted to snugly engage over the end handles of a battery mounted on said base plate, and means adapted to variously position such curved ends of the loop portions to adjust the same to various sized batteries.

16. A battery suspension device, comprising a relatively rigid frame to be supported within the frame of the vehicle, a battery receiving carriage, and adjustable means interposed between said carriage and said frame and adapted to yieldingly support said carriage upon said frame.

17. A battery suspension device, comprising a relatively rigid frame to be supported within the frame of the vehicle, a battery receiving carriage, and adjustable cushioning means interposed between said carriage and said frame and adapted to yieldingly support said carriage upon said frame.

18. A battery suspension device, comprising a relatively rigid frame to be supported within the frame of the vehicle, a battery receiving carriage, and adjustable cushioning means interposed between said carriage and said frame and adapted to yieldingly support said carriage upon said frame and to cushion movement of said carriage in either vertical direction.

19. A battery suspension device, comprising a relatively rigid frame to be supported within the frame of the vehicle, a battery receiving carriage, adjustable resilient means interposed between said carriage and said frame, said resilient means being adapted to cushion movement of said carriage caused by movement of said frame, and means for varying the tension of said resilient means.

20. A battery suspension device, comprising a relatively rigid frame to be supported within the frame of the vehicle, a battery receiving carriage mounted on said sub-frame and having vertical movement with respect thereto, resilient members adapted to cushion and restrain such movement of said carriage in either vertical direction and means for varying the tension of said resilient members.

21. A battery suspension device comprising a frame, resilient means mounted on said frame and adapted to yieldingly support a battery thereon, and means carried on said resilient means and adapted to engage a battery and maintain the same on said first named means.

22. A battery suspension device comprising a frame, resilient means mounted on said frame and adapted to yieldingly support a battery thereon, and adjustable clamp members carried on said resilient means and adapted to engage a battery and maintain the same on said first-named means.

23. A battery suspension device comprising a frame, resilient means mounted on said frame and adapted to yieldingly support a battery thereon, and adjustable clamp members carried on said resilient means and adapted to engage various sized batteries and maintain the same on said first-named means.

24. A battery suspension device, comprising a frame, resilient means mounted on said frame and adapted to yieldingly support a battery thereon and adapted to cushion movement of said battery in either vertical direction, means carried on said resilient means and adapted to engage said battery and maintain the same on said first-named means.

25. A battery suspension device, comprising a frame, resilient means mounted on said frame and adapted to yieldingly support a battery thereon and adapted to cushion movement of said battery in either vertical direction, and adjustable clamp members carried on said resilient means and adapted to engage said battery and maintain the same on said first named means.

26. A battery suspension device, comprising a frame, resilient means mounted on said frame and adapted to yieldingly support a battery thereon and adapted to cushion movement of said battery in either vertical direction, and adjustable clamp members carried on said resilient means and adapted to engage various sized batteries and maintain the same on said first-named means.

27. A battery suspension device comprising a relatively rigid frame adapted to be supported within the frame of the vehicle, a battery-receiving carriage mounted in said first-named frame, a plurality of guides attached to said carriage and extending through said first-named frame and resilient members disposed about each of said guides between said carriage and said frame, and said frame and the extending ends of said guides, said members being adapted to form a yielding support for said carriage and also to cushion a restrain movement of said carriage in either vertical direction or laterally.

28. A battery suspension device comprising a relatively rigid frame adapted to be supported within the frame of the vehicle, a battery-receiving carriage mounted in said first-named frame, a plurality of guides attached to said carriage and extending through said first-named frame and coiled springs disposed about each of said guides between said carriage and said frame, and said frame and the extending ends of said guides, said members being adapted to form a yielding support for said carriage and also to cushion and restrain movement of said carriage in either vertical direction or laterally.

29. A battery suspension device comprising a relatively rigid frame adapted to be supported within the frame of the vehicle, a battery-receiving carriage mounted in said first-named frame, a plurality of guides attached to said carriage and extending through said first-named frame and longitudinally yielding cylinders disposed about each of said guides between said carriage and said frame, and said frame and the extending ends of said guides, said members being adapted to form a yielding support for said carriage and also to cushion and restrain movement of said carriage in either vertical direction or laterally.

Signed by us, this 20 day of February, 1917.

FRANCIS S. DENNEEN.
COURTNEY N. MITCHELL.